United States Patent [15] 3,662,350

Chertok [45] May 9, 1972

[54] RANDOM ACCESS MEMORY SYSTEM EMPLOYING A PHONOGRAPH DISK

[72] Inventor: Allan B. Chertok, Cambridge, Mass.

[73] Assignee: EG&G, Inc., Bedford, Mass.

[22] Filed: Jan. 28, 1970

[21] Appl. No.: 6,484

[52] U.S. Cl. ....................... 340/173 R, 179/100.4 D, 274/15, 340/174.1 C
[51] Int. Cl. ....................................... G11b 3/08, G11b 17/06
[58] Field of Search .................. 274/15; 340/174.1 C, 173 R, 340/173 AM; 179/100.4 D

[56] References Cited

UNITED STATES PATENTS

| | | | |
|---|---|---|---|
| 2,081,885 | 5/1937 | Runyan | 274/15 |
| 2,952,464 | 9/1960 | Stimler | 274/15 |
| 2,953,383 | 9/1960 | Walters | 274/15 |
| 3,105,963 | 10/1963 | Stevens et al. | 340/174.1 C |
| 3,368,080 | 2/1968 | Nakagiri et al. | 274/15 |

*Primary Examiner*—Bernard Konick
*Assistant Examiner*—Raymond F. Cardillo, Jr.
*Attorney*—Ralph L. Cadwallader, Lawrence P. Benjamin and Kenway, Jenney & Hildreth

[57] ABSTRACT

A memory system employing a phonograph disk with a multi-turn spiral groove carrying digital information distributed throughout it. The turns each contain two storage locations identified as addresses. When an address is entered, the stylus arm is moved radially across the record from a home position, impulses from the stylus resulting from traversal of the grooves being counted to determine when the stylus is at the addressed location.

36 Claims, 15 Drawing Figures

ALLAN B. CHERTOK
INVENTOR

BY

ATTORNEYS

ALLAN B. CHERTOK
INVENTOR

BY
Kenway, Jenney & Hildreth
ATTORNEYS

ALLAN B. CHERTOK
INVENTOR

BY [signatures]
Kenway, Jenney & Hildreth
ATTORNEYS

ALLAN B. CHERTOK
INVENTOR

Ralph L. Cadwallader
BY Lawrence L. Benjamin
Kenway, Jenney & Hildreth
ATTORNEYS

RANDOM ACCESS MEMORY SYSTEM EMPLOYING A PHONOGRAPH DISK

FIELD OF THE INVENTION

This invention relates in general to digital data storage and more particularly to a random access data storage system in which the memory element is a grooved phonograph disk.

BACKGROUND OF THE INVENTION

A random access digital data storage system employing a grooved phonograph disk as the memory element is described in my pending application Ser. No. 817,068, filed Apr. 17, 1969 and assigned to the assignee of the rights of this application. In general such a storage system employs a phonograph disk with a spiral groove inscribed on its surface. The data is stored in the form of mechanical undulations in the groove, the form of the undulations being such that a phonograph stylus tracking along the groove will provide electrical output signals indicative of the stored digital data. A particularly suitable signal format for the storage of such digital data is described in my pending application Ser. No. 788,441, filed Jan. 2, 1969 and assigned to the assignee of all the rights to the present application.

The digital data is stored in a series of "addresses" corresponding to specific radial portions of the spiral groove. The data storage system includes logic circuit elements and mechanical features so that, in order to obtain the information stored at a specific address, the digital code representing that address is entered into the logic circuitry and this circuitry provides electrical signals controlling a positioning mechanism for the phonograph stylus to position the stylus in approximately the radial groove location corresponding to that address. In most applications of memory systems, a minimum access time is desirable. The time which is required to access a given address depends upon the precision with which the stylus can be located at the correct radial address. In a relatively high density storage medium application, a 7-inch record would contain approximately 500 radial positions on the spiral groove with a total data storage capacity of 5 million bits. The mechanical tolerances required to position an arm from a home position off the disk to a specific radial groove are extremely high. However, significant advantages of a phonograph disk memory system arise from the economical factors of a relatively inexpensive readout device and an easily replicated memory medium. These advantages would be considerably offset if very stringent mechanical tolerances were required.

By employing suitable calibration techniques, these mechanical tolerances can be relaxed while still achieving acceptable positioning accuracy and access time. In the copending applications, the addressing mechanism described includes a stepping motor driving a worm screw to advance the arm carrying the phonograph stylus a discrete distance from a home position according to the address entered to be interrogated. In one embodiment, in order to achieve appropriate accuracy, this home position is established after the record is placed on the turntable by a technique which results in the home position being located precisely above a specific address on the record groove. Hence, instructions to go to another address require that the arm be moved only from one address on the groove to another address on the groove. This technique is somewhat complex, however, because the home position is not represented by a mechanical stop, but is, rather, a position represented by an electrically stored designation.

Another approach to the same problem involves a sequence in which the arm is positioned at a mechanical stop off of the turntable and, upon an address being entered, a two-step sequence is initiated. In the first step, the arm moves to a position over the outer 50 grooves of the record. Each of these grooves contains only information identifying which of the 50 grooves it is. The arm mechanism transports the stylus to approximately the center of these 50 grooves and, upon engagement with the groove, the arm provides a signal indicating in which of the 50 grooves it is located. With this identification of its relative position on the record, the number of steps which the arm must be moved radially from this calibration groove to the entered address is computed and the stepping motor again provides this motion.

In order to further compensate for the possibility of mechanical error, the phonograph arm is transported, not precisely to the addressed position, but rather to a position several grooves, typically three, outside of the addressed groove section. Once the stylus is engaged in the spiral groove, it will, of course, be carried inwardly by the rotational motion of the record. Therefore, this technique insures that the stylus is always positioned further out on the record than the sought address and thereby avoids a situation where the easing of mechanical tolerances would permit the stylus to be positioned further in on the record than the sought address.

BRIEF SUMMARY OF THE INVENTION

In the present invention, the data storage system employs a phonograph record with a spiral groove carrying the stored data in ordered sequence as undulations in the groove. The data is distributed in the record according to address patterns which identify specific radial groove locations on the disk. The phonograph arm carrying the stylus has a normal home position in which it is mechanically stopped close to the center of the disk inside of the innermost data carrying track. Radial indexing is accomplished by applying a torque to the phonograph arm causing the stylus, which is in physical contact with the disk, to "skate" outwardly across the disk. As the stylus traverses the groove walls, it will produce electrical output signal pulses. This train of pulses then provides a series of signals which count the grooves so traversed. When a specific address is to be interrogated, this address is either entered as a specific groove number or is decoded by logic circuitry to a groove number and the stylus arm is then skated outwardly until the number of signals representing grooves traversed equals the sought address. At this point the torque is removed, stopping the stylus, the turntable motor is actuated to rotate the disk and the stylus now tracks inwardly, allowing the data contained in the groove to be read out. In order to provide for a margin of error in the radial positioning, once again the stylus arm is actually skated to a position several, for example, three, grooves further out than the addressed radial position.

With this type of addressing system, employing a 7-inch disk having grooves 1.5 mils wide with a groove pitch of 333 and one-third turns per inch, and a total of approximately 500 grooves, the average access time to determine whether a specific eight-digit number is listed on the disk was 5.5 seconds. The speed of rotation was 45 RPM and it was found that with a cartridge having a tracking force between 1 and 3 grams and a skating speed of 200 turns per second, and a disk temperature of less than 90° F., the wear rate on a vinyl record was acceptable.

Utilizing this "skating" technique for addressing the memory results in achieving a short access time without requirements of excessively high mechanical tolerances, while maintaining the economic advantages of the phonograph record system. Thus the home position of the arm can be determined by a mechanical stop, irrespective of the particular record on the turntable and the calibration steps required in previously described systems are eliminated. In addition both the electrical and mechanical complexity of previous systems may be considerably reduced in embodiments of the skating technique. There are described below three different embodiments of the present invention. In one embodiment the radial positioning of the phonograph arm is controlled by a mechanical linkage driven by a scotch yoke coupled to a unidirectional synchronous motor. The linkage is coupled to the phonograph arm electromagnetically so that when the correct radial position is reached the arm may be substantially instantaneously decoupled. The other two described embodiments utilize bi-directional stepping motors driving a belt which is coupled to the phonograph arm in one instance by a direct mechanical linkage and in the other by an electromagnetic linkage. In similar fashion other mechanical arrangements, such as a series of independent cams for controlling the mechanical positioning of the arm may be employed.

DESCRIPTION OF PREFERRED EMBODIMENTS

Figure 1:
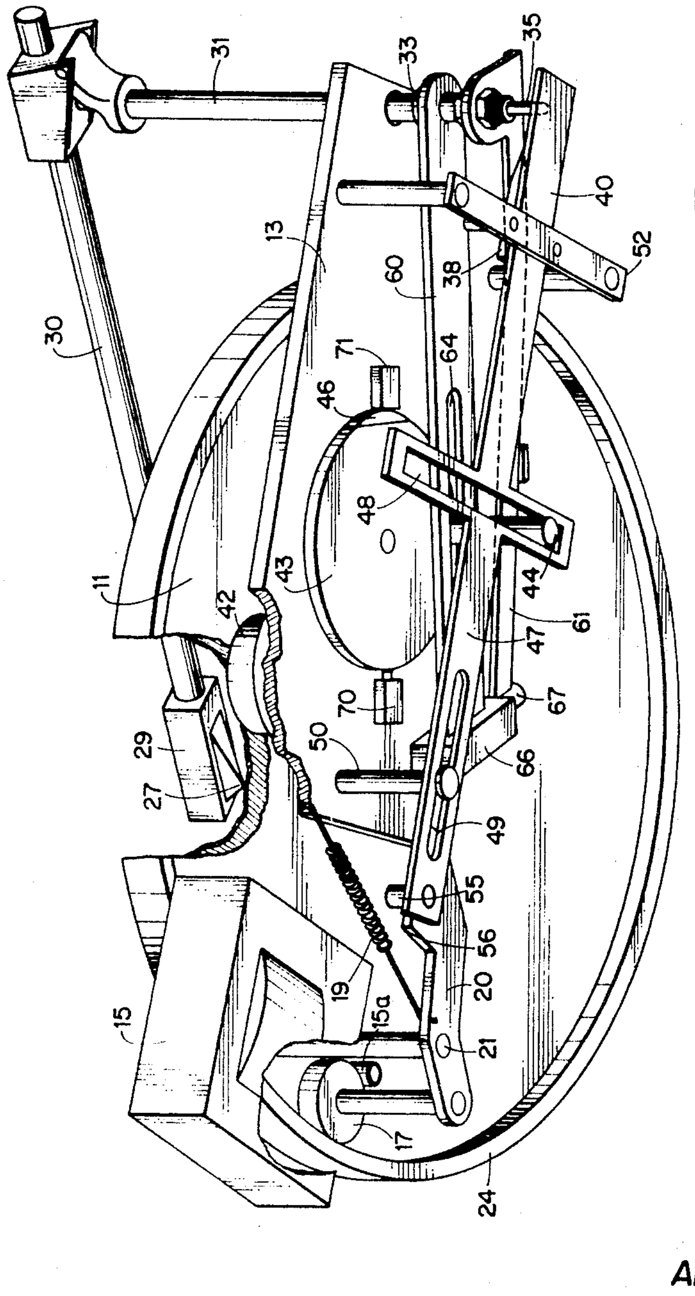
FIG. 1 is a perspective view of the underside of a turntable and addressing mechanism useful in the practice of this invention.

Referring now to FIG. 1, there is illustrated in perspective view a turntable and arm positioning mechanism for one embodiment of the invention. The mechanism is positioned below the turntable and a portion of the turntable is broken away to show the phonograph stylus mounted on the arm. It will be understood that the turntable is to be mounted on a suitable spindle (not shown) and in an appropriate housing. The turntable 11 is mounted on the spindle to rotate with respect to a mechanical base generally illustrated by the support plate 13. The rotational power for the turntable is provided from a turntable motor 15 which is coupled through a friction idler element 17 to the turntable. The idler element 17 is mounted on a crank arm 20 pivoting about pivot 21 and retained in position by virtue of spring 19. This crank acts to engage and disengage the frictional idler element 17 from turntable rim 24 and motor shaft **15*a* thereby preventing flats from developing on the idler during long periods of disuse. The phonograph stylus 27 is carried as part of a cartridge 29 on phonograph arm 30 which is pivotally mounted by means of pivot axle 31, mounted in bushing 33 to permit rotation of the axle 31 and hence arm 30 with respect to the mounting plate 13. Within the tubular axle 31 there is mounted a lifting rod 35 which is positioned to be engaged by a cam surface 38 on yoke 40 to raise and lower the arm 30 so that the stylus is engaged or disengaged from the surface of a record carried on the turntable 11**.

The mechanism for radially traversing the phonograph arm 30 from its home position near the center of the phonograph record to an addressed position, is generally shown as a mechanism mounted beneath plate 13. This mechanism is arranged to go through a cycle in which the phonograph arm is initially positioned at a home position near the center of the disk, the innermost data carrying portion of the groove being further out radially on the disk. From this home position the arm is skated outwardly with the stylus 27 in contact with the groove on the record. When the stylus reaches a groove which lies a few turns beyond the addressed portion of the groove, the phonograph arm is released from the mechanism providing the torque by deenergizing an electromagnetic coupling. The turntable is then rotated, allowing the stylus to track inwardly along the groove until it is precisely at the addressed position and, when the information stored therein has been read out, the arm is lifted from the record, the turntable is stopped and the arm is traversed back to its home position. The details of this mechanism and the way in which it operates are most clearly seen from FIGS. 2A through 2E in which the position of the mechanism for a series of steps in the cycle of operation is shown.

In general, the mechanism includes a cycle control motor 42, which is a unidirectional synchronous motor driving a generally circular cam 43 including an actuating lobe 46 and having an offset post 44 mounted on it. A pair of microswitches 70 and 71 are positioned to be actuated by the lobe 46 to indicate whether the cam 43 is in its "home" or "limit" position. A yoke member 47 is formed as an extended longitudinal piece with a transverse section, the transverse section having a slot 48 with the post 44 from the cam 43 positioned to ride within slot 48. The longitudinal section of the yoke 47 has a second slot 49 which engages a pin 50 fixed to the mounting plate 13. A bracket 52 fixed to the mounting plate 13 retains the yoke 47 in the appropriate vertical position. A cam surface 38 is mounted on one end of the yoke 47 for raising and lowering the lifter rod 35. A lug 55 at one end of the yoke 47 is positioned to engage a cam surface 56 on the crank arm 20.

In addition to the above elements, the mechanism also includes a pair of arms 60 and 61 which are pivoted about the same pivot point as the axle 31. Arm 61 is fixed to the pivot axle 31 and rotation of this arm, therefore rotates the phonograph arm 30 which carries the stylus. The second arm 60 is fixed to pivot loosely about the bushing 33 and includes a longitudinal slot 64 positioned such that the offset post 44 rides within it. At the opposite end of arm 60 from the pivot, there is attached an electromagnet 66. On the corresponding end of the arm 61 there is located an armature plate 67.

These components are arranged so that, when the electromagnet 66 is energized, rotation of the cam 43 with the resulting motion of arm 60 in a generally counterclockwise arc, will pull arm 61 after it until the magnet is deenergized. When deenergization of the electromagnet 66 occurs, the arm 60 will continue its motion but, since arm 61 is now decoupled from it, arm 61 remains in the position it occupied at the time the electromagnet 66 was deenergized. Continued rotation of the cam 43 will result in a subsequent clockwise motion of arm 60 and irrespective of the state of energization of the electromagnet 66, when this arm 60 comes in contact with the armature plate 67 it will push the arm 61 back until arm 61 contacts the mechanical stop 75. The arm 60 and electromagnet 66 serve as a coupling link to impart motion from the cam 43 to arm 61 and yet this torque can be substantially instantaneously removed by deenergization of the magnet when the arms are traveling in the counterclockwise direction.

Figure 2A:
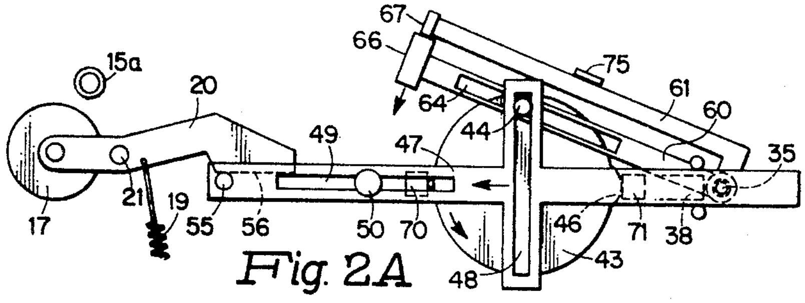
FIGS. 2A, 2B, 2C, 2D and 2E illustrate a sequence of positions of a portion of the mechanism of FIG. 1 as the address operation cycle takes place.

In FIG. 2A, the addressing mechanism is illustrated in its home position. Since the cam lobe 46 is in the home position it is actuating the home microswitch 71. The yoke 47 is near the center of its left-right travel range and the cam surface 38 is not raising the lifter rod 35 and, accordingly, the phonograph arm is in its down position, with the stylus contacting the surface of the record. The arm 61 is positioned against a stop 75 and the arm 60 is positioned so that the electromagnet 66 is directly contacting the armature plate 67. The position of lug 55 with respect to the cam surface 56 of the crank arm 20 is such that the arm 20 has pivoted the idler element 17 thereby relieving pressure contact with the turntable motor shaft **15*a* and turntable rim 24**.

Figure 2B:
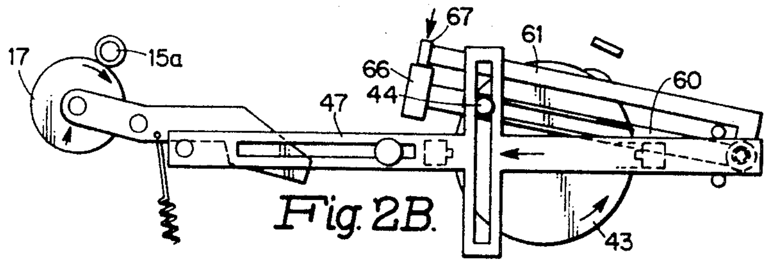

When the address to be interrogated is entered the cycle control motor 42 is actuated causing the cam 43 to rotate in a counterclockwise direction. As illustrated in FIG. 2B, the rotation of this cam causes the yoke 47 to translate to the left thereby allowing the spring 19 to pivot the arm 20 bringing the idler element 17 in pressure contact with the turntable motor shaft **15*a* and turntable rim 24**. As will be explained below in further detail, at this point in the operation the turntable motor is not actuated and hence, although the drive is coupled to the turntable, there is no rotational motion imparted.

Figure 2C:
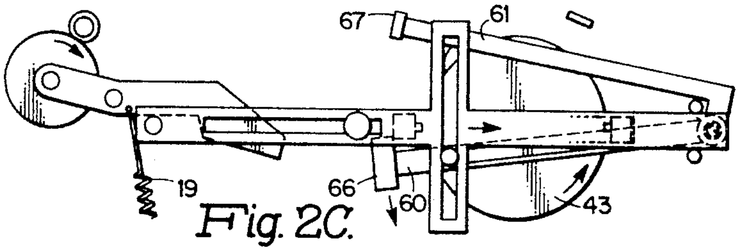
Figure 2D:
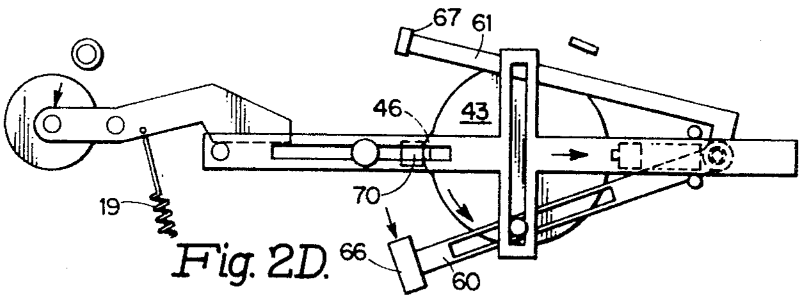
Figure 2E:
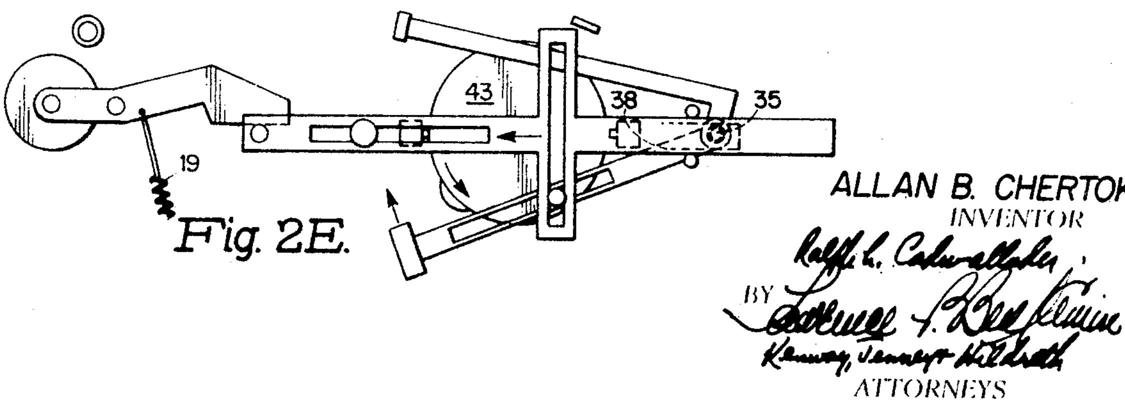

In FIG. 2C, the mechanism is shown with the cam 43 having rotated still further. In this illustration, however, the electromagnet 66 was deactuated at a time when the cam 43 was in the position shown in FIG. 2B. Since the only connection between the cam 43 and arm 61 is through the electromagnet 66, the arm 61 remains in its former position. The arm 60, on the other hand, continues to rotate with the rotation of the cam 43. The rotation of the cam 43 and the arm 60 continues until the lobe 46 on cam 43 reaches the limit microswitch 70. At this point the cycle control motor rotating cam 43 is shut off by the actuation of this switch and the mechanism stops in a position shown in FIG. 2D. The exact position at which the electromagnet 66 is deenergized to release the armature plate 67 and hence to mechanically decouple arm 60 from arm 61, will depend upon the portion of the groove to be addressed by the cartridge carrying arm 30. The phase of actuating lobe 46 is such that the arm 30 can carry the stylus 27 somewhat beyond the outermost turn of the spiral before the limit switch 70 is actuated.

Once the cycle motor 42 has been deenergized it will remain deenergized until the information stored at the entered address is read out by the stylus and electrical circuitry. A signal from the logic circuitry will thereafter again energize the cycle motor to continue the counterclockwise rotation of the cam 43. As the cam 43 continues its rotation the yoke 47 continues to translate to the right until the cam surface 38 is beneath the pusher rod 35, thereby raising the stylus 27 out of engagement with the record. Continued rotation of the cam 43 will now cause the arm 60 to reciprocate back in the direction indicated by the arrow toward the original home position and, by the time the lobe 46 has again moved to the position shown in FIG. 2A, the arm 60 has returned to its original position pushing the arm 61 ahead of it. The phonograph arm is in its up position so that the stylus does not contact the record on this return trip.

Figure 3:
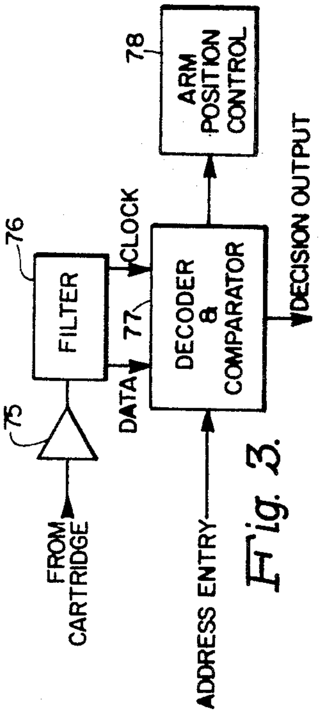
FIG. 3 is an illustration in block diagrammatic form of a data retrieval system for operation in conjunction with the mechanism of FIG. 1.

In FIG. 3, there is illustrated in block diagrammatic form a system for taking data and position indicating pulses from the phonograph cartridge and applying them through an amplifier 75 to a filter 76. The filter 76 separates clocking pulses from data pulses and provides two separate outputs, one a clock output and one a data output, to the decoder and comparator circuit 77. The decoder and comparator circuit also receives an address entry input which indicates what address on the memory disk is to be interrogated. One output from the decoder and comparator goes to the arm position control unit 78. It is this unit which provides the control information to actuate the turntable motor, the cycle control motor and the electromagnet in the illustrated positioning mechanism. The other output from the decoder and comparator unit 77 is designated as the decision output and provides an output related to the information found at the interrogated address. One application for the memory system of this invention is in looking up listed numbers such as credit card numbers. Logic and electrical circuitry for such an operation is described in pending application Ser. No. 845,021, filed July 25, 1969 and, assigned to the assignee of all of the rights of this invention.

Figure 9:
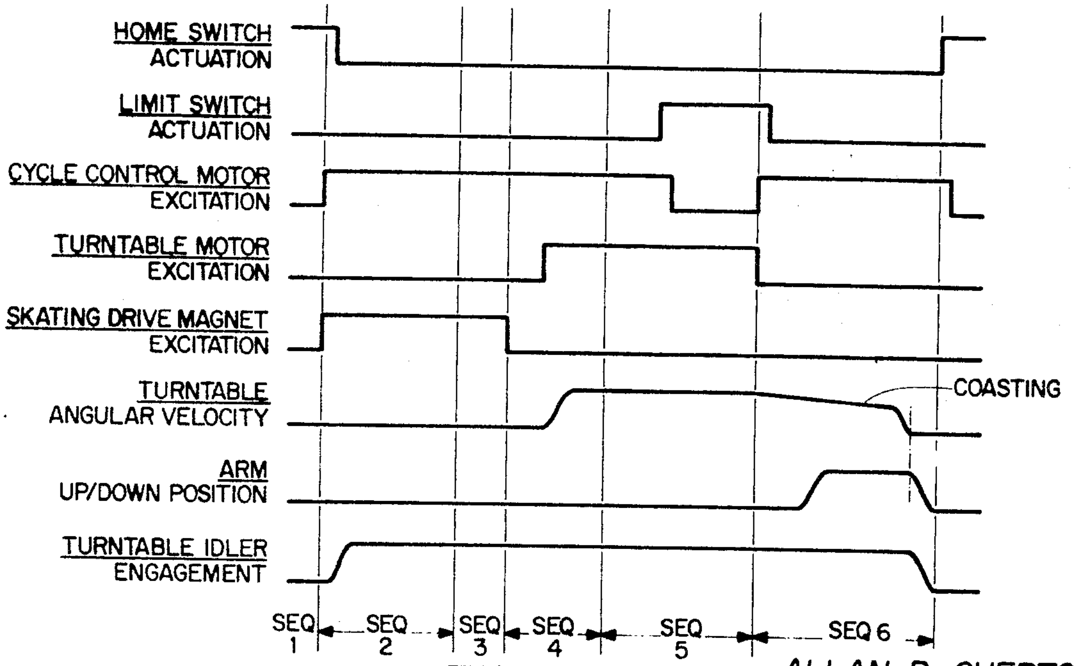
FIG. 9 is a time flow chart indicating the actuation of various elements in the mechanism of FIG. 1 during an operational address cycle.

In Table I, below, the sequence of operation of the addressing mechanism is tabulated in terms of six discrete sequence steps, the activities which the system is to perform during each step, and the exit events which signify the conclusion of that step and the transition to the next step. FIG. 9 shows the state of actuation of each of the energizable elements of the system at various points in the sequence. FIG. 4 through FIG. 8 illustrate logic subsystems for implementing the sequence steps of Table I and will be described in more detail below.

TABLE I

| Step | Activity | Exit Event |
|---|---|---|
| Sequ. 1 | Load address for skate | Load Complete |
| Sequ. 2 | Skate to Entered Address Position | Stylus Pulse Count Reaches Address Controlled Value |
| Sequ. 3 | Skate Extra **5** grooves for radial margin | Stylus Pulse Count To Preset Limit |
| Sequ. 4 | Actuate Turntable For | Disk data Provides Entered Address |
| Sequ. 5 | Stylus tracking Read Out Data | Output Decision Signal |
| Sequ. 6 | Recycle Address Mechanism to Home Position | Enter New Address |

The six-step sequence is initiated when an address is entered into the system for the purpose of ascertaining the information stored at the position on the grooved record designated by that address. The address may be entered as such and the information subsequently determined once the radial position on the grooved record is reached or the address may be designated by specific selected digits in a multidigit entry. This latter situation is the case, for example, when the system is being utilized to determine whether a specific 10-digit number is listed on a record disk, having a spiral groove with 500 turns, each turn including two addresses, designated "tracks." These 1,000 addresses may then be indicated by three digit positions and the 10-digit numbers may be distributed on the record in radial positions designated by these digit values. The six-step sequence continues from this initial entry of the address until the stylus arm is again in its home position, the information stored at the entered address then having been read out.

The first step in the sequence is one in which the digit address to be accessed is loaded into the addressing mechanism. In Sequence-1 none of the elements illustrated in FIG. 9 have been actuated and the stylus arm is in its down position. Sequence-1 is completed when the loading step has been completed and this is indicated by an electrical output signal indicating that the address has been entered into an appropriate register.

The second sequence step, Sequence-2, is that in which the stylus arm is skated to the radial position corresponding to the entered address. This is accomplished by actuating the cycle control motor 42 and the electromagnet 46 so that arms 60 and 61 commence their arcuate radial movement. As the stylus traverses each hill and dale in the groove portion of the record it provides an output pulse which is applied to an electronic counter the output of which is compared with the address entered into the register. Sequence-2 is completed when equivalence is attained.

At the commencement of Sequence-3, each of the elements, whose state is illustrated in FIG. 9, are in the same condition of energization as they were in Sequence-2. The purpose of Sequence-3 is for the stylus arm to skate outwardly an extra few grooves, typically five, to provide a margin against radial positioning error. This is accomplished by continuing the skating out action of the stylus arm a specific extra number of grooves after the addressed position is achieved. At the conclusion of this motion the magnet 66 is deenergized thereby releasing the arm 61 from the linkage arm 60. The linkage arm 60 continues to move with the cam in response to the cycle control motor action.

The Sequence-4 step is one in which the turntable motor is actuated to produce rotation of the disk so that the arm may commence its tracking motion inwardly. The turntable motor is not energized instantaneously with the deenergization of the skating drive magnet 66, but rather occurs a small time delay later. This time delay is provided to allow the stylus 27 to achieve a stable position in the groove after deenergization of the magnet. Since, at the moment of deenergization of the magnet, the arm has been moving outwardly across the disk, the stylus tip is deflected more toward the center of the record then it is in its normal passive position below the arm. Were the turntable to be energized substantially simultaneously with the deenergization of the magnet, any eccentricity in the spiral groove might cause the stylus to jump out of the groove and skip several grooves further out on the disk. Once this time delay has elapsed, the turntable motor is energized and, as indicated in FIG. 9, shortly thereafter the turntable angular velocity is up to normal speed. Sequence-4 is terminated when the entered address is read from the disk indicating that the arm has in fact arrived at the appropriate address position.

Upon completion of Sequence-4 the system provides an output indication of the information stored at the entered address and this, during Sequence-5, results in an output decision signal. During Sequence-4 or Sequence-5, the cam lobe 46 reaches and actuates the limit switch 70, thereby deenergizing the cycle control motor 42. When the output decision from the electronics system has occurred, Sequence-5 is terminated and Sequence-6, which is a recycle process to bring the apparatus to its home position, takes place.

In Sequence-6, the cycle control motor is again energized and the turntable motor is deenergized. The action of the cycle control motor 42 in driving cam 43 deactuates the limit switch 70 and through the action of the cam surface 38 raises the stylus arm into its up position so that the stylus 27 is out of engagement with the record disk while it is returning to its radial home position. Sequence-6 is terminated when the linkage arm 60 and 61 have returned to their home position against stop 75 and the cam 43 has rotated until lobe 46 again actuates the home switch 71.

Figure 4:
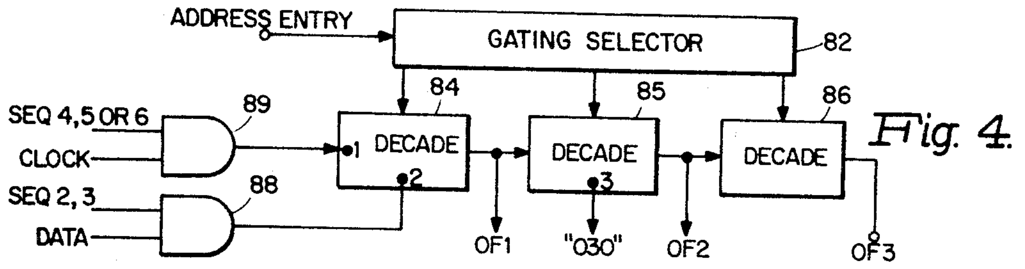
FIGS. 4, 5, 6, 7 and 8 are illustrations in block diagrammatic form of logic circuitry sub-systems for use in controlling the address and turntable mechanism of FIG. 1.

The logic subsystems for controlling the sequence and actuation of the elements described previously are shown in FIGS. 4 through 8. FIG. 4 illustrates in block diagrammatic form one embodiment of a subsystem for entering the sought address. The address is entered into a gating selector 82 which is coupled in parallel to each of three cascaded decade counter elements 84, 85 and 86. In a typical example for a 7 inch record having 500 turns in the spiral groove there are 1,000 addresses consisting of two sections or tracks per turn. The address is then designated by a three-digit decimal number. Depending upon the value of this number, the gating selector 82 will select three digits in the cascaded three-decade counter so that these counters have stored in them a three-digit decimal number designating the address.

Two other inputs are provided to this decade counter chain. One input is from AND-gate 88, which provides an output signal only when it receives at its inputs both a data input signal from the stylus representing the stylus traversing a groove turn in the disk and a signal indicating that the system is in Sequence-2 or Sequence-3. This input is provided to the "two" input of decade 84, so that each pulse representing a traversed turn during Sequence-2 or Sequence-3 is effectively applied to the decade counter as two counts. The other input to the decade counter chain is from AND gate 89 which provides an output signal for each clock pulse occurring during the final three steps of the sequence.

If the address entered into the decade counter chain represents twice the number of groove turns from the outer edge of a 500-turn section and the total three-decade counter provides an output signal on the 1,000th pulse, then this arrangement will provide an output signal OF3 from the decade counter 86 when the arm has skated from the inner edge to the groove turn containing the designated address. That is, the arm will have skated a number of turns equal to 500 minus one-half the decimal value of the address. This OF3 output ends Sequence-2, and the system is now operating in Sequence-3. The decade counter chain 84, 85 and 86 has been reset to zero as a result of complementing the entered address with the pulses from AND-gate 88.

The appearance of output signal OF3 transfers the system into operation in Sequence-3. In this sequence the pulses from the stylus as the stylus skates over the groove turns accumulate until the counter 84 is full, that is until a count of 10 corresponding to five groove pulses has been received. At this point the output signal OF1 is generated terminating the step, Sequence-3.

At the end of Sequence-3, the stylus is in the appropriate portion of the groove and, as discussed earlier, a short delay is required before the turntable motor 15 is actuated. This delay is provided by clock pulses, for example a 60-cycle per second clock providing input signals through gate 89 to the "one" input of the decade counter chain 84, 85 and 86. Since this decade counter chain has in it at this time the value 010, it will take one-third of a second for the decade counter 85 to be filled to its three-count level so that the decade chain reading is 030. An output is taken from the three level of decade 85, which output is used to actuate the turntable motor and commence rotation of the turntable during the Sequence-4 step.

Figures 5, 6, 7, 8:
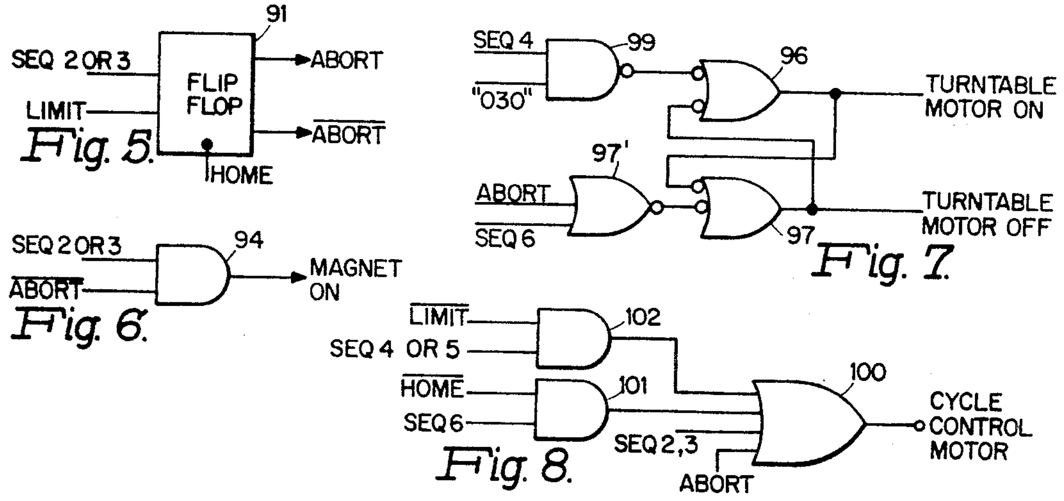

In FIG. 5 there is illustrated a flip-flop device 91 which serves the function of providing an "abort" output any time during the steps, Sequence-2 or Sequence-3, when the limit switch 70 is actuated. Since, during the time the stylus is skating to the specified address, the limit switch 70 should not be actuated, the conjunction of these two conditions as an input to the flip-flop 91 signifies that the cycle has been operating inproperly and provides an abort signal to return the system to its home position with the turntable off. This flip-flop 91 is therefore reset to the $\overline{\text{abort}}$ condition when the home switch 71 is actuated. In addition a timer may be connected to this abort input to abort the sequence after a preset time. Thus if the sequence does not locate the appropriate address within a specified time, the system is reset.

In FIG. 6 there is illustrated a logic subsystem for controlling the condition of the electromagnet 66. This is an AND-gate 94 having as one input a signal indicating that the system is in Sequence-2 or Sequence-3 and as a second input a signal indicating that there has been no abort signal. Under these conditions the magnet 66 is kept actuated thus linking arms 60 and 61. As earlier indicated, Sequence-3 is terminated by a signal from output OF1 and therefore this output effectively deenergizes the magnet 66.

In FIG. 7 there is illustrated a logic subsystem for controlling the condition of the turntable motor 15. This subsystem includes a pair of NOR-gates 96 and 97 with the output of NOR-gate 96 providing an actuating signal to energize the turntable motor 15 and the output of NOR-gate 97 providing a deenergizing signal to turn off the turntable motor 15. Each of the NOR-gates 96 and 97 have their outputs coupled as one input to the other gate thus providing that only one of the two gates 96 and 97 may have an energized output at any given time. The other input to NOR-gate 96 comes from NAND-gate 99 which provides a zero levels output signal only in response to the conjunction of a signal indicating that the system is in Sequence-4 and a "030" output from the decade counter 85. NOR-gate 97 has an input from OR gate 97' which has an inverter on its output and two inputs, one from the abort output from flip-flop 91 and the other a signal indicating that the system is not in Sequence-6. Thus this NOR-gate 97 provides an output only if the system has been told to abort or if it is in Sequence-6. It is the output from this NOR 97 which turns the turntable motor off.

The subsystem illustrated in FIG. 8 controls the state of energization of the cycle control motor 42. An OR-gate 100 provides the energizing output signal to cycle control motor 42 in response to an actuating signal on any one of its four input lines. One input line is energized in response to an abort signal on the output of the flip-flop 91 in the abort control subsystem and a second input line is energized whenever the system is in Sequence-2 or Sequence-3. A third input line is energized by the output of AND-gate 101 which has for its input a signal indicating the system is in Sequence-6 and a signal indicating that the home microswitch 71 is not actuated. The final input lead to OR-gate 100 is from another AND-gate 102 which provides an output signal only in response to the conjunction of a signal indicating that the system is in one of the steps Sequence-4 or Sequence-5 and a signal indicating that the limit switch 70 has not been actuated.

Figure 10:
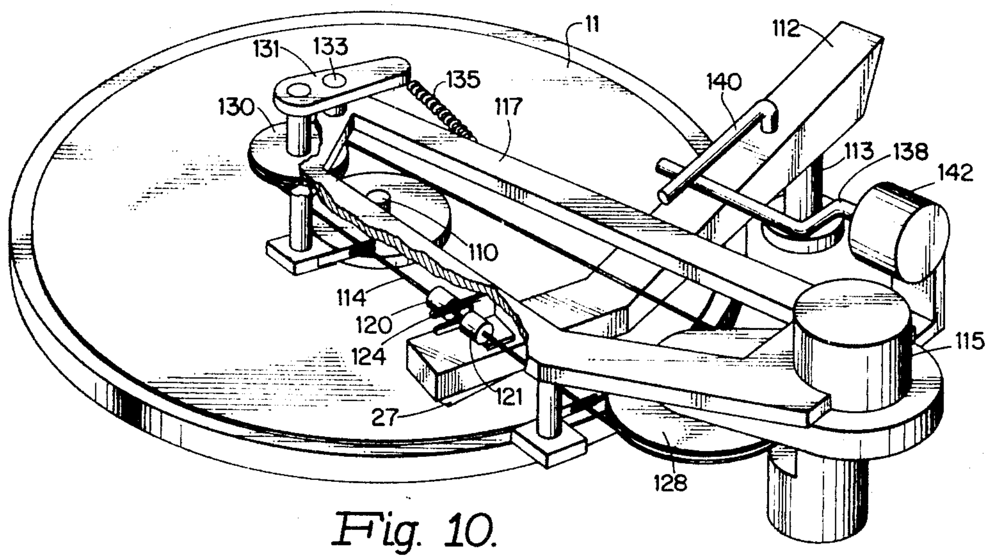
FIG. 10 is an illustration in perspective view of second embodiment of a turntable and address mechanism useful in the practice of this invention.

Referring to FIG. 10, a second embodiment of the addressing mechanism for a memory system is illustrated. In this mechanism the turntable 11 is rotated on a spindle 110 to provide rotation of the memory disk (not shown). The phonograph stylus 27 is carried on arm 112 which is pivoted at post 113 for rotational motion to move the stylus 27 in an arc radially across the turntable 11. The radial motion of the arm 112 is imparted to it by a belt 114 driven by a stepping motor 115 mounted on a cantilevered support bracket 117. The belt 114, which typically could be formed of monofilament nylon line, has mounted on it a pair of stop members 120 and 121. A slotted lug 124 is fixed to the stylus arm 112 and slides over the belt 114 between the two stop members 120 and 121. Therefore as the belt 114 moves in either direction one or the other of the stop members engages the lug 124 carrying the arm 112 along the motion of the belt. The belt is driven from the motor 115 through a pulley 128 pivoted on a portion of the bracket 117. The further end of the belt 114 carries around an idler pulley 130 which is mounted on one end of a crank arm 131, the arm being pivoted at 133 through the bracket 117. The further end of the crank arm 131 is held under tension to the bracket 117 by means of a spring 135, thereby maintaining the belt 114 under tension. The arm 112 may be lifted out of engagement with the record by means of an offset shaft member 138 which engages a pin 140 on the arm. Upon actuation of the actuating element 142 the offset arm 138 rotates to raise the stylus carrying arm 112.

In general the operation of this embodiment is similar to that of the embodiment illustrated in FIG. 1, that is, the phonograph arm is positioned at a point near the center of the disk and is skated outwardly across the disk while the stylus is in contact with the grooves, each traversal of a groove producing a pulse. The traversing motion of the stylus arm is produced by the stepping motor 115, which is bidirectional, operating in one direction as the stylus arm moves to the addressed groove and in the opposite direction to carry the stylus arm in its raised position, back to the original home radial position. In this arrangement of FIG. 10, however, there is no electromagnet and accordingly the stepping motor is stopped at a point several grooves beyond the addressed position. Upon actuation of the turntable, the stylus then commences tracking the groove. In the arrangement of FIG. 10 the stop element 120 would normally be in physical contact with the slotted lug 124 at the conclusion of the skating out action and thus the arm would not be able to track the groove. Accordingly, once the stylus is in the correct groove, the stepping motor would normally be reversed and run a few steps in the opposite direction so that the lug 124 would be centered in the space between the stop elements 120 and 121.

Figure 11:
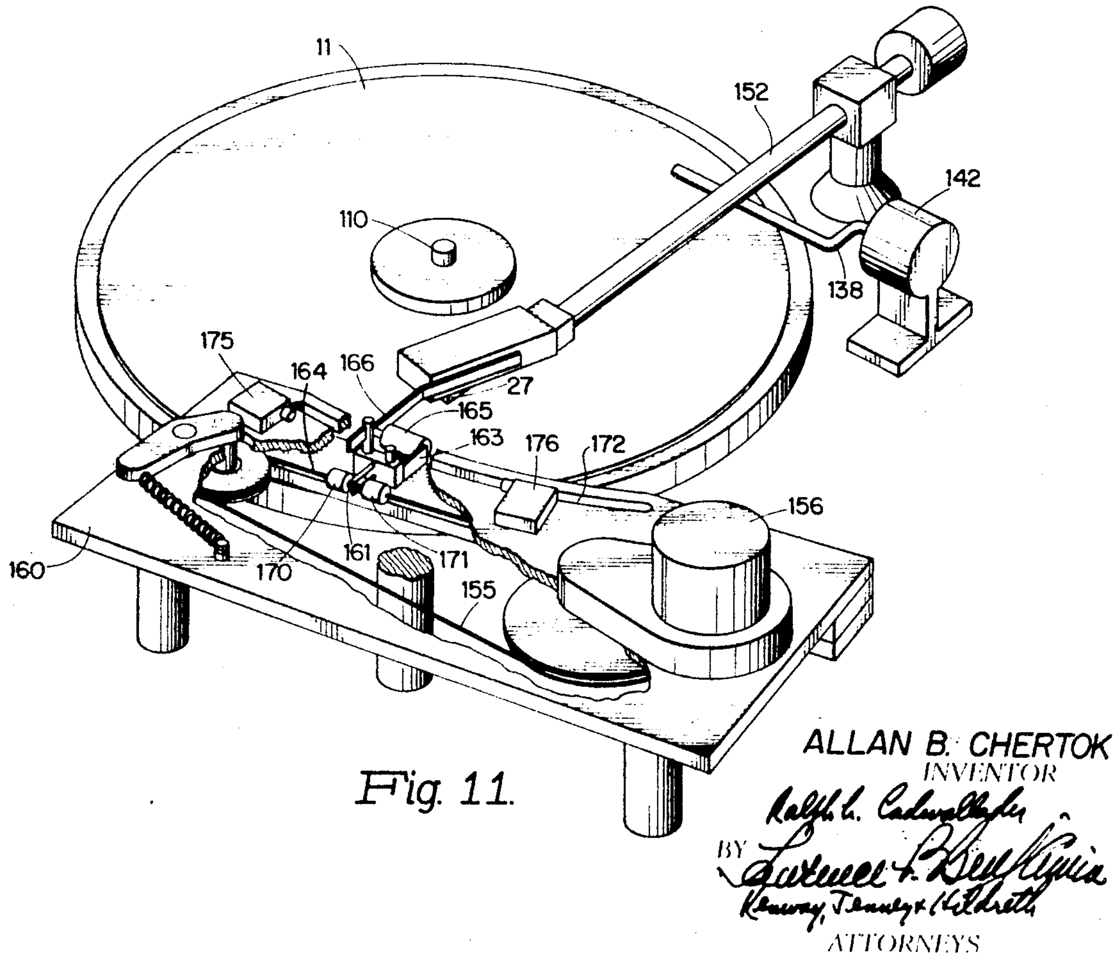
FIG. 11 is an illustration of a third embodiment of a turntable and address mechanism useful in the practice of this invention.

The embodiment of FIG. 11 is similar to that of FIG. 10 in that the radial motion of the arm 152 is imparted to it by means of a belt 155 driven by a bidirectional motor 156. In this embodiment however, the drive mechanism is mounted on a plate 160 supported somewhat to the side, with a slight overlap of the turntable 11. Once again an offset arm 138, actuated by an element 142, is used for raising the arm out of engagement with the record for its return from the addressed position to the home position. In the embodiment of FIG. 11, however, the arm 152 is not directly coupled to stops 170 and 171 on the belt 164. Rather a follower element 163 has a pair of pins 161 which are positioned between the stop element 170 and 171 over the belt and thus this follower element 163 is driven by the belt in the same fashion as that of the arm 112 in the embodiment of FIG. 10 is driven. The follower element 163, however, is positioned to ride in a cam slot 172 cut in the plate 160. The cam slot 172 has mounted at positions along it, a first microswitch 175, which serves the function of a home microswitch and a second microswitch 176 which acts as a limit switch. Attached to the follower 163 is an electromagnet 165 and attached to the stylus arm 152 is an extended armature plate 166.

In operation then the electromagnet is energized and the motor commences to move in one direction carrying the follower element 163 outwardly along the slot 172. Since the electromagnet 165 is energized, the arm 152 is mechanically coupled through armature 166 to the follower element 163 and is therefore traversed radially outwardly across the record. When the appropriate position on the record, a few groove turns beyond the position of the entered address, is reached, the electromagnet 165 is deenergized, decoupling the arm 152 from the follower element 163. The follower element 163 then continues until it engages the limit switch 176, which stops the motor 156 until an output decision has been rendered following ascertaining of the information at the entered address. At this point the motor 156 is energized to drive the follower element 163 in the opposite direction along the slot 172 until it physically engages the armature plate 166 which it then pushes back to the home position.

Since the stylus is positioned in the correct turn by the electromagnetic release, the motor 156 need not be a stepping motor.

While only three embodiments have been described, it is apparent that other mechanisms may also be employed to perform several of the described functions. In the system described above provision is made in the circuit for the stylus to reach the turn corresponding to the entered address and then skate an additional five turns to provide a margin of error.

There are some circumstances in which it may be desirable to reduce the number of extra turns skated. Thus, two turns may be a sufficient margin of error for some situations or specific disks. Another factor is that of temperature. In order to minimize "bounce" of the stylus relatively heavy loading of 3 to 5 grams is preferred. At higher temperatures, however, a lighter load is required to avoid excessive wear on a vinyl disk. With a load of 1.5 grams, the stylus will "bounce" an extra two or three grooves further out at the end of the skating action, thus only two extra turns need to be skated. One technique for reducing the number of groove turns skated beyond the address is to include extra non-information turns at the inner portion of the spiral. The electronic system counts these turns in arriving at the address and they effectively subtract from the extra skated turns. Thus these turns may be reduced without modification of the addressing system.

Another feature which may be included in systems of this type, is the employment of a two speed or continuously variable motor. The motor is run at high speed during that portion of the cycle in which the arm is skated to the designated address. The slower speed is employed in skating the arm the extra five turns. Since the limitation on the speed of skating arises from requirement for precision in stopping at a designated location, this two-speed system permits far higher skating speed in the longer part of the cycle.

I claim:

1. A memory system for storing digital information comprising, a disk having a multi-turn spiral groove therein, said information being stored within said groove;

address entry means for entering an address indicative of a specific portion of said groove to be accessed;

a readout head mounted for substantially radial movement across said spiral groove and for tracking movement within said groove upon rotation of said disk;

means for rotating said disk;

means responsive to the entry of an address into said address entry means for moving said readout head radially across said disk in contact with said disk such that said readout head produces output signals for each turn of said spiral traversed;

means coupled to said address entry means and to said readout head for stopping the traversing movement of said readout head in a radial position in said groove determined by a comparison between said entered address and the readout head signals produced during the traversing motion, said means for rotating thereafter rotating said disk to produce tracking movement of said readout head within said groove, and output means producing output signals indicative of the information stored at said addressed position within said groove.

2. A memory system in accordance with claim 1 wherein said rotating means operates to rotate said disk only after the traversing motion of said readout head has been stopped.

3. A memory system in accordance with claim 2 wherein said rotating means commences rotation of said disk at a predetermined time delay after the traversing motion of said readout head has stopped.

4. A memory system in accordance with claim 1 wherein said stored digital information is stored in the form of undulations within said spiral groove and said readout head includes a phonograph stylus.

5. A memory system in accordance with claim 4 wherein said readout head has a normal home position near the center of said disk and wherein said spiral commences at a point further out on said disk than said home position, the traversing motion of said readout head being from the home position outwardly across said disk.

6. A memory system in accordance with claim 5 wherein said means for stopping the traversing movement of said readout head includes a comparator means for comparing the entered address to the number of signals produced by the readout head upon traversing the turns of said groove, said stopping means acting in response to said comparator means only to stop said traversing movement when said stylus has traversed a specific number of turns beyond the radial position corresponding to the entered address.

7. A memory system for storing digital information comprising,

- a disk having a multi-turn spiral groove therein, said digital information being stored as a series of undulations within said groove,
- address entry means for entering an address indicative of a specific portion of said groove to be accessed;
- a transducer including a phonograph stylus;
- an arm pivotally mounted on a pivot positioned beyond the edge of said disk, said arm carrying said transducer for radial motion of said transducer transversely across the turns of said groove and for tracking movement within the groove upon rotation of said disk;
- means for rotating said disk;
- means responsive to the entry of an address into said address entry means for moving said arm radially across said disk, maintaining said stylus in contact with said disk such that said transducer produces an electrical output signal for each turn of said spiral as it is traversed;
- means responsive to the entered address and to the signals from said transducer for stopping the traversing radial motion of said arm when said stylus is positioned in a turn in said groove further out on said disk than the specific portion corresponding to the entered address, said rotating means thereafter rotating said disk to produce tracking movement of said transducer within said groove, and
- output means coupled to said transducer for producing output signals indicative of the information stored at said addressed position.

8. A memory system in accordance with claim 7 wherein said transducer has a normal home position near the center of said disk and wherein said radial traversing motion of said transducer is outwardly from said home position across the turns of said groove.

9. A memory system in accordance with claim 8 and further including means operative after the information stored at said address position has been ascertained for disengaging said stylus from contact with said disk and returning said transducer to its home position.

10. A memory system in accordance with claim 8 wherein said means for stopping the traversing movement of said arm includes a comparator means for comparing the output signals from said transducer with said entered address and for actuating said stopping means to stop the traversing motion only when the signals from said transducer indicate that said stylus is positioned in a portion of said groove several turns beyond that portion of the groove corresponding to the entered address.

11. A memory system in accordance with claim 7 wherein said means for moving said arm radially across said disk includes a motor and a mechanical linkage for coupling said motor to said arm such that rotation of said motor produces said radial traversing motion of said arm.

12. A memory system in accordance with claim 11, wherein said mechanical linkage includes an energizable electromagnetic element, said electromagnetic element being energized for traversing motion of said arm, said means for stopping the motion of said arm acting to deenergize said electromagnetic element to decouple said arm from said motor to stop the traversing radial motion of said arm.

13. A memory system in accordance with claim 11 wherein said mechanical linkage includes a belt having means for mechanically linking a specific section of said belt to said arm and wherein said motor is a bi-directional stepping motor which is operated in a first direction to move said arm radially across said disk in an outward direction, while said stylus is in contact with said disk and to operate in the opposite direction to move said arm inwardly to a rest position near the center of said disk after said output means has produced the output signals indicative of the stored information.

14. A memory system in accordance with claim 13 wherein said means for linking said arm to said belt includes an energizable electromagnetic element which is energized for moving said arm radially across said disk and wherein said means for stopping radial motion of said arm includes means for deenergizing said electromagnetic element to stop the traversing radial motion to said arm.

15. A memory system in accordance with claim 14 and further including first and second limit switches, said first limit switch being positioned near said belt to be actuated by said electromagnetic element at a position corresponding to the arm having moved radially to a position at the outer edge of said disk, the second limit switch being positioned to be actuated by the electromagnetic element on said belt at a position corresponding to the arm being positioned near the center of said disk in a home position, said first and second limit switches, upon actuation, acting to deenergize said motor.

16. A memory system in accordance with claim 11 wherein said mechanical linkage includes a cam having at least one cam surface and wherein said motor is a uni-directional motor, said mechanical linkage being such that it includes means for reversing the direction of motion of said arm after said linkage has traveled a predetermined distance in a first direction, whereby said arm may be moved from an initial position near the center of said record outwardly across the turns in said spiral groove and thereafter move from an outer position at the periphery of said disk back inwardly across said turns in said groove to said initial position.

17. A memory system in accordance with claim 16 wherein said cam includes a second cam surface positioned to raise said arm to disengage the stylus from physical contact with said disk surface when said arm is moving in the opposite direction to return to its rest position.

18. A memory system in accordance with claim 16 wherein said mechanical linkage includes an energizable electromagnetic element coupling said arm to said motor, said electromagnetic element being initially energized to provide for moving said arm in a radial traversing motion across said spiral turns, said stopping means including means for deenergizing said electromagnetic element to stop the traversing radial motion of said arm.

19. A memory system in accordance with claim 18 and further including first and second limit switches positioned to be actuated by said cam surface when said electromagnetic element is in a position such that if said electromagnetic element is energized, said arm is positioned at the extreme outer edge of disk, the actuation of said first limit switch acting to stop the action of said motor, said second limit switch being positioned to be actuated by said cam surface when said arm is positioned at a home position near the center of said disk, said second limit switch, when actuated stopping the action of said motor.

20. Apparatus for positioning a memory system readout transducer at a radial position on a disk having a multi-turn spiral groove inscribed thereon, the radial position being designated by an address entered into an entry means in said system, said apparatus comprising, means mounting said readout transducer for substantially radial movement across said spiral groove and for tracking movement within said groove upon rotation of said disk;

means responsive to the entry of an address into said address entry means for moving said readout transducer radially across said disk in contact with said disk such that said readout transducer produces output signals for each turn of said spiral traversed;

means responsive to said entered address for stopping the traversing movement of said readout transducer in a radial position in said groove determined by a comparison between said entered address and the readout transducer signals produced during the traversing motion.

21. Apparatus in accordance with claim 20 wherein said transducer includes a phonograph stylus.

22. Apparatus in accordance with claim 21 wherein said readout transducer has a normal home position near the center of said disk and further in than the point at which said spiral groove commences, the traversing motion of said readout transducer being from the home position outwardly across said disk.

23. Apparatus in accordance with claim 22 wherein said means for stopping the traversing movement of said readout transducer includes a comparator means for comparing the entered address to the number of signals produced by the readout transducer upon traversing the turns of said groove, said stopping means acting in response to said comparator means only to stop said traversing movement when said stylus has traversed a specific number of turns beyond the radial position corresponding to the entered address.

24. Apparatus for positioning a memory system readout transducer including a phonograph stylus at a radial position on a multi-turn spiral groove inscribed on a memory disk, the radial position being designated by an address entered into an entry means in said system, said apparatus comprising;

an arm pivotally mounted on a pivot positioned beyond the edge of said disk, said arm carrying said transducer for radial motion of said transducer transversely across the turns of said groove and for tracking movement within the groove upon rotation of said disk;

means responsive to the entry of an address into said address entry means for moving said arm radially across said disk, maintaining said stylus in contact with said disk such that said transducer produces an electrical output signal for each turn of said spiral as it is traversed;

means responsive to the entered address and to the signals from said transducer for stopping the traversing radial motion of said arm when said stylus is positioned in a turn in said groove farther out on said disk than the specific portion designated by the entered address.

25. Apparatus in accordance with claim 24 wherein said transducer has a normal home position near the center of said disk and wherein said radial traversing motion of said transducer is outwardly from said home position across the turns of said groove.

26. Apparatus in accordance with claim 25 and further including means operative after the information stored at said address position has been ascertained for disengaging said stylus from contact with said disk and returning said transducer to its home position.

27. Apparatus in accordance with claim 25 wherein said means for stopping the traversing movement of said arm includes a comparator means for comparing the output signals from said transducer with said entered address and for actuating said stopping means to stop the traversing motion only when the signals from said transducer indicate that said stylus is positioned in a portion of said groove several turns beyond that portion of the groove corresponding to the entered address.

28. Apparatus in accordance with claim 24 wherein said means for moving said arm radially across said disk includes a motor and a mechanical linkage for coupling said motor to said arm such that rotation of said motor produces said radial traversing motion of said arm.

29. Apparatus in accordance with claim 28 wherein said mechanical linkage includes an energizable electromagnetic element, said electromagnetic element being energized for traversing motion of said arm, said means for stopping the motion of said arm acting to deenergize said electromagnetic element to decouple said arm from said motor to stop the traversing radial motion of said arm.

30. Apparatus in accordance with claim 28 wherein said mechanical linkage includes a belt having means for mechanically linking a specific section of said belt to said arm and wherein said motor is a bi-directional stepping motor which is operated in a first direction to move said arm radially across said disk in an outward direction, while said stylus is in contact with said disk and to operate in the opposite direction to move said arm inwardly to a rest position near the center of said disk after said output means has produced the output signals indicative of the stored information.

31. Apparatus in accordance with claim 30 wherein said means for linking said arm to said belt includes an energizable electromagnetic element which is energized for moving said arm radially across said disk and wherein said means for stopping radial motion of said arm includes means for deenergizing said electromagnetic element to stop the traversing radial motion to said arm.

32. Apparatus in accordance with claim 31 and further including first and second limit switches, said first limit switch being positioned near said belt to be actuated by said electromagnetic element at a position corresponding to the arm having moved radially to a position at the outer edge of said disk, the second limit switch being positioned to be actuated by the electromagnetic element on said belt at a position corresponding to the arm being positioned near the center of said disk in a home position, said first and second limit switches, upon actuation, acting to deenergize said motor.

33. Apparatus in accordance with claim 28 wherein said mechanical linkage includes a cam having at least one cam surface and wherein said motor is a uni-directional motor, said mechanical linkage being such that it includes means for reversing the direction of motion of said arm after said linkage has traveled a predetermined distance in a first direction, whereby said arm may be moved from an initial position near the center of said record outwardly across the turns in said spiral groove and thereafter move from an outer position at the periphery of said disk back inwardly across said turns in said groove to said initial position.

34. Apparatus in accordance with claim 33 wherein said cam includes a second cam surface positioned to raise said arm to disengage the stylus from physical contact with said disk surface when said arm is moving in the opposite direction to return to its rest position.

35. Apparatus in accordance with claim 33 wherein said mechanical linkage includes an energizable electromagnetic element coupling said arm to said motor, said electromagnetic element being initially energized to provide for moving said arm in a radial traversing motion across said spiral turns, said stopping means including means for deenergizing said electromagnetic element to stop the traversing radial motion of said arm.

36. Apparatus in accordance with claim 35 and further including first and second limit switches positioned to be actuated by said cam surface when said electromagnetic element is in a position such that if said electromagnetic element is energized, said arm is positioned at the extreme outer edge of disk, the actuation of said first limit switch acting to stop the action of said motor, said second limit switch being positioned to be actuated by said cam surface when said arm is positioned at a home position near the center of said disk, said second limit switch, when actuated stopping the action of said motor.

* * * * *